United States Patent [19]

Sadamitsu et al.

[11] Patent Number: 4,648,718
[45] Date of Patent: Mar. 10, 1987

[54] OPTICAL MEASURING SYSTEM

[75] Inventors: Nishihara Sadamitsu, Tokyo; Kawahara Yuji, Saitama, both of Japan

[73] Assignee: Mitutoyo Mfg. Co., Ltd., Tokyo, Japan

[21] Appl. No.: 757,736

[22] Filed: Jul. 22, 1985

[30] Foreign Application Priority Data

Jul. 26, 1984 [JP] Japan .................................. 59-156997

[51] Int. Cl.⁴ ............................................. G01B 11/08
[52] U.S. Cl. ..................................... 356/387; 250/560
[58] Field of Search ................. 356/386, 387; 256/560

[56] References Cited

U.S. PATENT DOCUMENTS 3,765,774 10/1973 Petrohilos ............................ 250/560
4,097,158 6/1978 Dehait ................................. 250/560

Primary Examiner—R. A. Rosenberger
Attorney, Agent, or Firm—Koda and Androlia

[57] ABSTRACT

The invention provides an optical measuring apparatus in which an object to be measured is scanned by parallel measuring rays, the length of the object being measured from changes of intensity of the measuring rays. The received rays are utilized as start and stop signals from a counter for counting clock pulses. The measuring rays are emitted from a laser and reflected by a rotating mirror to scan the object. When the measuring rays are blocked by the object, the counting operation of the counter is initiated. As the rays again appear from behind the object, the counting operation is stopped. The number of clock pulses counted between the start and stop of the counting operation is used to measure the length of the object. Any error induced from deflection or scattering of the measuring rays at the end faces of the object or from the transparent part of the object can be avoided by providing a register for latching the output of the counter. The register latches the value in the counter on receiving either of a detection signal indicative of the finish end of the object or false detection signals. The final latched value corresponding to the finish end of the object is utilized.

2 Claims, 3 Drawing Figures

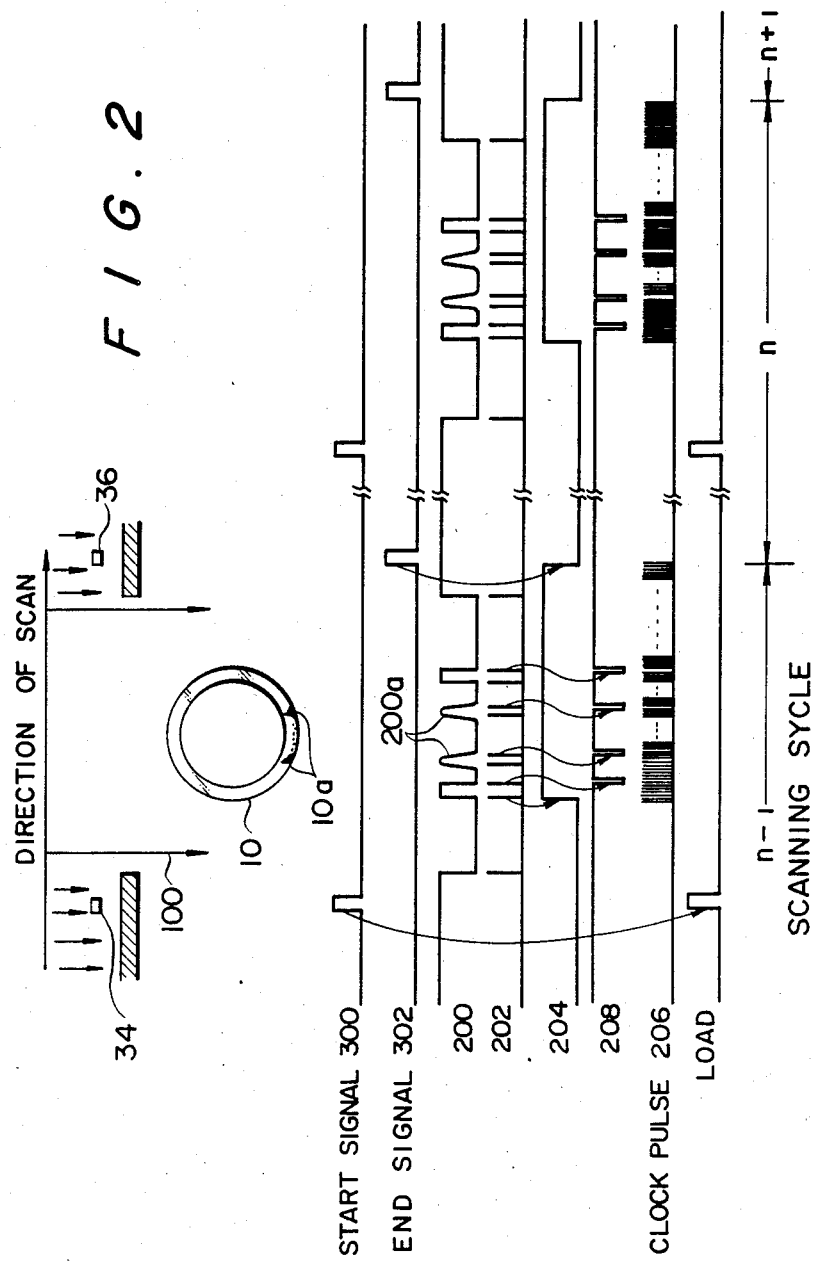

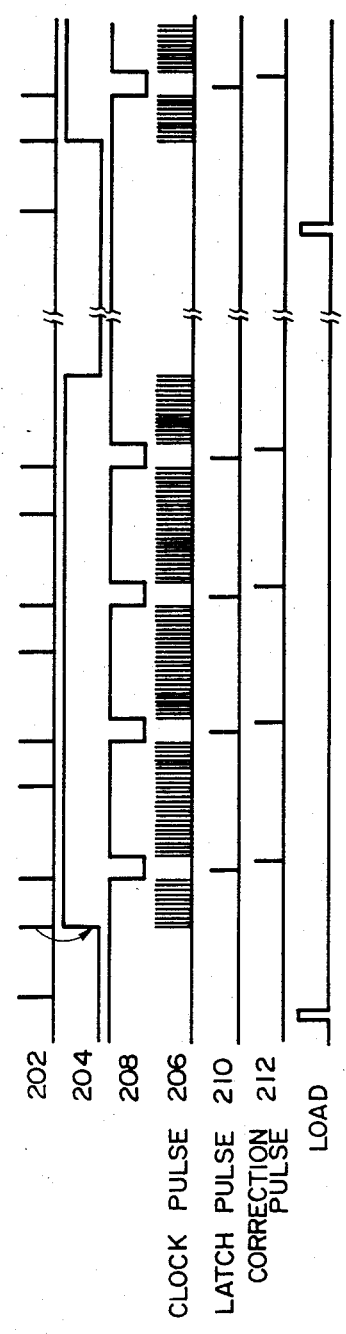

OPTICAL MEASURING SYSTEM

BACKGROUND OF THE INVENTION

1. Field of the Invention

The present invention relates to the improvement of an optical measuring apparatus and particularly of an optical measuring apparatus for measuring the length of an object to be measured by illuminating the object with parallel scanning and measuring rays and sensing the change of the amount of light received at the opposite ends of the object to detect a time of scan required between the opposite ends of the same.

2. Description of the Prior Art

There is well-known an optical measuring system for scanning an object to be measured with parallel rays such as a laser beam and the like and detecting the transmission or blocking of light depending on the shape of the object to measure a time required to scan the object between the opposite end thereof by the parallel rays utilizing, for example, a clock-pulse counter. Such an optical measuring system has been practically used as a laser micrometer.

Such an optical measuring system is very effective particularly for objects being soft or having raised temperatures since it does not exert any pressure upon objects and can provide precise measurements without affection from deformation and others. The system also is very useful in measuring articles having complicated shapes since it can measure any desired portion of an article having any complex configuration.

Japanese Laid-Open Patent Application Sho No. 58-205803 discloses an optical measuring system of the above type in which precise measurement can rapidly be effected for each of divided segments within a range of measurement. However, this disclosed system is disadvantageous in that unexpected deflection and scattering are created by parallel scanning and measuring rays due to the shape or surface state on the end of an object to be measured. If the system is used for a transparent object to be measured, various unexpected transmissions or scatterings are produced during the scanning to provide an increased error in measurement.

In the conventional systems of the above type, clock pulses are synchronized and counted with parallel scanning and measuring rays. The number of counted clock pulses counted during a scanning between the opposite ends of the object is used to obtain a measurement. If the parallel scanning and measuring rays are deflected as by a foreign matter on the surface of the object and thereafter received by a photodetector or if a light transmitting through a transparent object to be measured is detected by the photodetector, the counting of the clock pulses will be terminated much more far prior to detection of the end of the object opposite to the end at which the counting is initiated. This leads to a very increased error in measurement. Such an error may create an almost unexpectable error due to the state of the object surface or the irregular light-transmission of the transparent object.

SUMMARY OF THE INVENTION

It is therefore an object of the invention to provide an improved optical measuring apparatus which can properly detect the opposite ends of an object to be measured without any error of measurement due to deflection and others even if the object is made of a light-transmissive material or has its undesirable surface such as surface contaminated by oil.

To accomplish the above object, the present invention is characterized by a combination of a counter with a register for suitably latching the output of the counter such that the number of clock pulses generated during a scanning between the opposite ends, that is, the start and finish ends of an object to be measured can be counted as the object is scanned by parallel scanning and measuring rays. The register is adapted to latch the counted number from the counter at each time when it receives either of a detection signal indicative of the finish end of the object or false detection signals generated based on the transparent part or others on the object during scanning. Since the final latch value corresponds to the finish end of the object, the register takes this final latch value and cancels the other false detection signals so that a proper measurement will be made.

In accordance with the present invention, the frequency of clock pulses is set to be high sufficiently to increase the accuracy in measurement. Therefore, the counting will always be effected with a small delay. To co-ordinate such a delay with the latching, the register latches the output of the counter after a predetermined delay of time. Furthermore, to prevent such a delay from causing a large error to be created in the counted value of the counter on latching each false finishing signal in mid course, the counter is temporarily disabled on each latching. Correction value corresponding to the disabling is supplied to the counter at each time after a latching has been completed in the register. In this manner, the counting operation of the counter can properly be aligned with the movement of the parallel scanning and measuring rays at all times.

BRIEF DESCRIPTION OF THE DRAWINGS

FIG. 2 is a chart of entire timing illustrating the measuring operation of the embodiment shown in FIG. 1.

FIG. 3 is a chart of timing illustrating the latching operation of a register, the disabling operation for a counter and the correcting operation by all of which the present invention is characterized.

DESCRIPTION OF PREFERRED EMBODIMENTS

Figure 1:
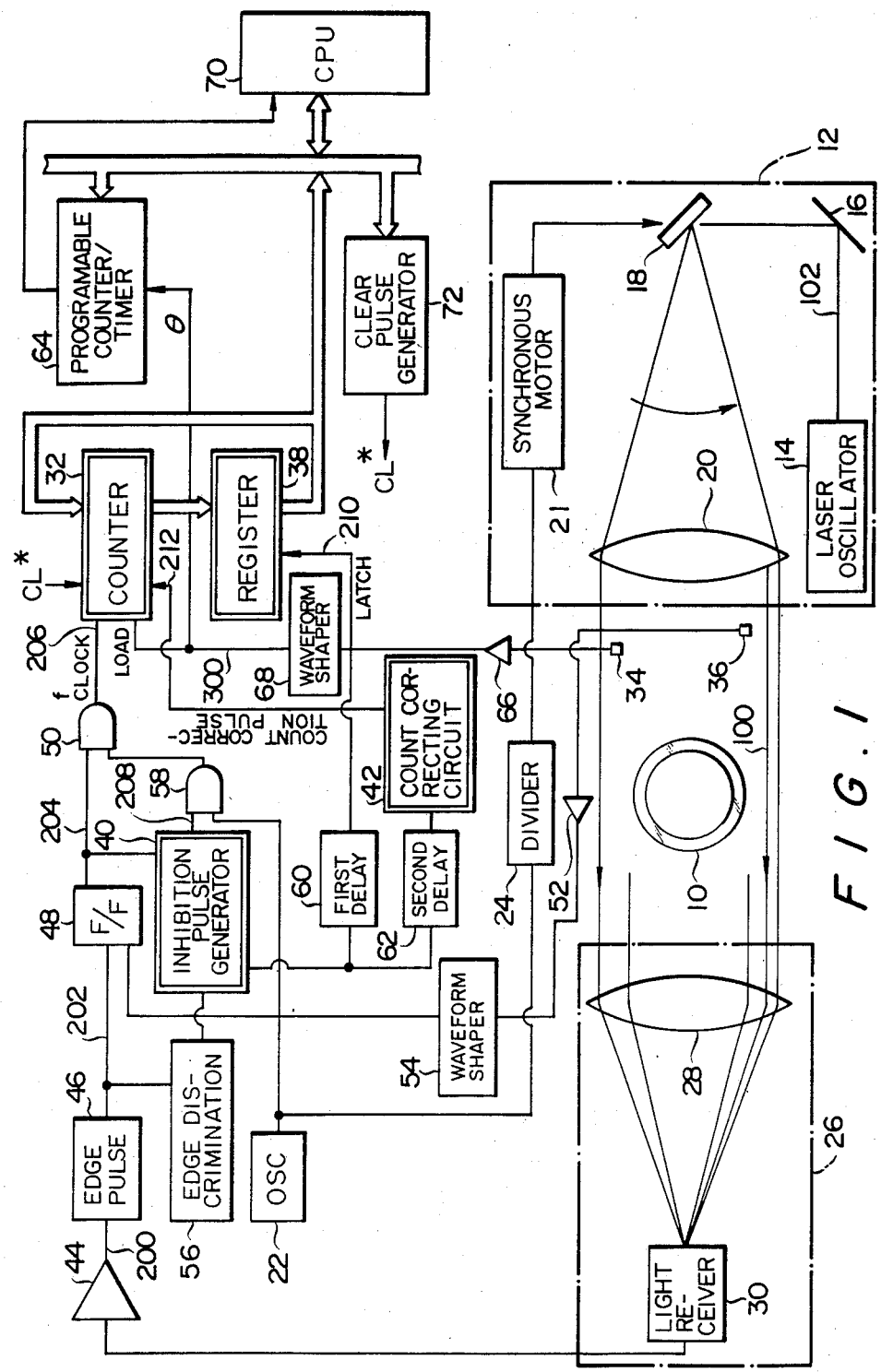
FIG. 1 is a block diagram showing a preferred embodiment of an optical measuring apparatus according to the present invention.

FIG. 1 shows a preferred embodiment of an optical measuring apparatus constructed in accordance with the present invention.

An object to be measured 10 is placed on a work table (not shown) within a range in which the object 10 can be illuminated by measuring rays. The object 10 may be movable. In such a case, the object 10 is inter-related to the measuring rays such that it will be positioned within said range with a given timing of motion. In the illustrated embodiment, the object 10 is a transparent cylinder.

There is provided a light scanning section 12 for emitting parallel scanning and measuring rays 100 by which the object 10 is illuminated. The light scanning section 12 comprises a laser oscillator 14, a stationary mirror 16 and a rotary mirror 18. A laser beam 102 emitted from the laser oscillator 14 is introduced into a collimator lens 20 through the stationary and rotary mirrors 16 and 18 and then discharged from the collimator lens 20 toward the object 10 as parallel scanning and measuring rays 100.

The rotation of the rotary mirror 18 is controlled by a synchronous motor 21 such that the rotational speed of the rotary mirror 18 will be synchronized with clock pulses for measurement as described hereinafter. In the illustrated embodiment, the output of a clock pulse generator 22 is supplied to the synchronous motor through a divider circuit 24. Therefore, the timing of scan in the parallel measuring rays 100 can be synchronized with the clock pulses to maintain a good accuracy in measurement.

Although the parallel scanning and measuring rays 100 from the aforementioned light scanning section 12 has a single predetermined range of scan, these rays may be divided into a plurality of segments through given slits so that measurement will be effected for each of the divided segments.

The parallel scanning and measuring rays 100 are detected by a photodetector 26 as electrical signals indicative of changes in their intensity after the object 10 has been illuminated by the rays 100. In the illustrated embodiment, the photodetector 26 comprises a condenser 28 and a light-receiving element 30 positioned at the focal point of the condenser 28. The light-receiving element 30 is adapted to generate a brightness output signal when the parallel scanning and measuring rays 100 are not blocked by the object 10 and to produce a darkness output signal as the rays 100 are blocked by the object 10.

If the opposite ends of the object 10 are properly detected by the parallel scanning and measuring rays 100, the photodetector 26 would generate two output pulse signals corresponding to the opposite ends of the object 10. When a time of scan between these two pulse signals is measured by counting the number of clock pulses synchronized with the motion of the parallel scanning and measuring rays 100, the distance between the ends of the object 10 can properly be measured.

There is also provided a counter 32 for counting the clock pulses and which is adapted to count the output of the clock pulse generator 22 in synchronism with the clock pulses used to control the rotary mirror 18.

Even if the object 10 has its undesirable end faces at which deflection or scattering is created or is made of a transparent material through which the measuring rays 100 pass to generate a number of false detection signals at the photodetector 26, the present invention makes a proper measurement possible by selecting proper signals from a number of signals including false detection signals. For this end, the present invention utilizes a first detection signal within a predetermined range of scan as a detection signal indicative of one end (start end) of the object 10. Subsequent detection signals including false signals are controlled by latchings. The final detection signal is used as a proper detection signal indicative of the other end of the object.

The system further comprises at least a pair of sensors 34 and 36 for respectively sensing the initiation and termination of a scanning, which are positioned within the range of scan such that the opposite ends of the range of scan can be detected. Each of these sensors 34 and 35 may be a photoelectric converting element which generates an electrical signal as the parallel scanning and measuring rays 100 pass over that sensor.

Although a single pair of sensors 34 and 36 are provided in the illustrated embodiment, the number of such sensors is not limited to this. For example, the plural pairs of such sensors may be located for segmented regions to be scanned by the parallel scanning and measuring rays 100.

The counter 32 counts clock pulses from the clock pulse generator 22 during the scanning of the parallel scanning and measuring rays 100 with respect to the opposite ends of the object 10 such that the desirable measurement can be carried out. In the illustrated embodiment, a transparent object 10 such as a glass pipe and the like can accurately be measured with respect to its external diameter. If the surface of the object 10 is irregular or has an opaque part, the photodetector 26 may generate a false detection signal as the portion of the object 10 other than the opposite ends thereof is scanned by the measuring rays. Such a false detection signal cannot be distinguished from a proper finish signal. To overcome such a problem, the present invention provides a register 38 for suitably latching the counted value from the counter 32. More particularly, the register 38 is adapted to latch both of a brightness signal or false detection signal detected by the photodetector 26 after the parallel scanning and measuring rays 100 have passed over the start end of the object 10 and a detection signal indicative of the finish end of the object 10. Thus, the final latched value can be outputted as a proper counted value.

However, the latching of the output of the counter 32 provides another problem. In a high-accuracy measuring system as in the present invention, the frequency of clock pulses becomes as high as 50–100 MHz. When such high-frequency clock pulses are counted by the counter up to its most significant bit, a period of time is required. Thus, a not-negligible mis-counting may be created as the register 38 operates to latching. Such a mis-counting is normally provided by the fact that the counter 32 receives the next clock pulse before the counted value therefrom is properly latched with the counted value therein being sequentially updated during the latching. There is thus a problem that a proper count cannot be effected by the above construction in which the output of the counter 32 is suitably latched by the register 38.

In accordance with the present invention, the counter 32 is disabled for a predetermined period of time during which the register 38 is operating to latch the output of the counter 32. For this end, the system of the present invention comprises a temporal inhibiting circuit or inhibit pulse generator 40.

When the operation of the counter 32 is inhibited, a larger error may be created during this inhibition. In accordance with the present invention, a counter correction pulse corresponding to this fixed inhibition period is supplied to the counter 32 after the register 38 has operated for each latching. This is accomplished by a counter correcting circuit 42.

The counting operation of the counter 32 is controlled by the output of the photodetector 26. Detection signals from the light-receiving element 30 are supplied to an edge pulse generator 46 through an amplifier 44 to detect the edge of the change in brightness of the light under differentiation of the edge pulse generator 46. The output of the edge pulse generator 46 is used to set a flip flop 48 which is set to generate the output for opening an AND gate 50 at each time when the start end of the object 10 is detected on each of scannings by the parallel scanning and measuring rays 100.

The flip flop 48 is reset by an output signal from the scan completion sensor 36. In the illustrated embodiment, the output of the sensor 36 is coupled with the reset terminal of the flip flop 48 through a pre-amplifier 52 and a waveform shaping circuit 54.

The inhibition pulse generator 40 is reset by the output of the flip flop 48 and also triggered by supplying the output of the edge pulse generator 46 thereto through an edge discrimination circuit 56. More particularly, the edge discrimination circuit 56 fetches only the trailing edge of the output pulse from the amplifier 44 and then supplies it to the inhibition pulse generator 40 such that the latter can be triggered at each time when the darkness signal is changed to the brightness signal.

The output of the inhibition pulse generator 40 is coupled with an AND gate 58. Clock pulses, which are the output of the clock pulse generator 22, are supplied to the clock input of the counter 32 through the AND gates 58 and 50. Thus, the counting operation of the counter 32 can temporarily be inhibited by the output of the inhibition pulse generator 40.

The inhibition pulse generator 40 controls the latching operation of the register 38. For this end, the output of the inhibition pulse generator 40 is coupled with the latch input of the register 38 through a first delay circuit 60. Thus, the content of the counter 32 can be latched by the register 38 at a predetermined time after an inhibition pulse has been generated. The inhibition pulse generator 40 also controls a count correction corresponding to the inhibition period of the counting operation in the counter 32. For this end, count correction circuit 42 is triggered through a second delay circuit 62. After the latching operation of the register 38 has been completed, a given count correction pulse is supplied to the counter 32 as a correction value used during the inhibition period.

In the illustrated embodiment, the object 10 is measured by using plural scannings of the measuring rays. The number of scannings is counted by a programmable counter 64 which is supplied with the output of the scan start sensor 34 through a pre-amplifier 66 and a waveform shaping circuit 68 to count the number of scannings by the measuring rays 100. The scan start signal is simultaneously supplied to the load input of the counter 32. Thus, the content of the register 38 can be stored in the counter 32 at each time when the scanning is initiated.

CPU 70 is provided to control all the operations of the counter 38, register 38 and others. When a predetermined number of scannings by the measuring rays 100 which is set by CPU 70 is completed, the CPU 70 fetches the content of the register 38. The CPU 70 comprises an arithmetic circuit which is not shown but is well-known in the art. The arithmetic circuit utilizes the fetched content of the register 38 to compute the averaging operation of the final latch values and the other operations with the resulting value being supplied to a display. After the computation has been completed, the output of a clear pulse generator 72 generates a clear pulse to clear the content of the counter 32.

The operation of the optical measuring system mentioned above will now be described with reference to FIGS. 2 and 3.

As shown in FIG. 2, a transparent cylinder of glass or the like which is an object to be measured 10 is shown to have a surface contaminated by oil or dirt 10a. Thus, some false detection signals would be generated between the when the object 10 is being scanned from end to end by the measuring rays 100.

The chart of timing illustrated in FIG. 2 shows the midway state in plural scannings in which as a start signal 300 from the scan start sensor 40 is supplied to the load input of the counter 32, the latch value, that is, one accumulated up to the preceding scanning in the register 38 is loaded in the counter 32. The start signal 300 also is counted by the programmable counter 64 as one scanning.

When the measuring rays 100 reaches the start end of the object 10, they are detected by the photodetector 26 which in turn generates a detection signal by which an output signal 200 from the amplifier 44 is changed to "H" level for detecting a darkness signal due to blocking of the object 10. Subsequently, detection signals including some false signals are outputted depending upon blocking and not-blocking of the object 10. In the illustrated embodiment, the detection signal 200 is shown to include detection signals properly indicating the opposite ends of the object 10 and false signals 200a corresponding to the foreign matters 10a.

The detection signal 200 is differentiated by the edge pulse generator 46 to form an edge pulse 202 at each time when the brightness is changed to darkness or vice versa. As seen from the charts of timing shown in FIGS. 2 and 3, the flip flop 48 is set to open the AND gate 50 by an initial leading edge pulse, that is, one corresponding to the start end of the object 10. At this time, the inhibition pulse generator 40 has been reset to open the AND gate 58 by the flip flop 48. The counter 32 is therefore supplied with clock pulses as signal 206.

Thus, the counter 32 will count clock pulses generated from the present scanning for the object 10 in addition to the accumulated clock pulsed up to the preceding scanning.

Since the clock pulses 206 have the frequency as high as 50–100 MHz as described hereinbefore, the counter 32 has some delay in counting and then requires a period of time until its counted value is stabilized.

When the measuring rays 100 separates from the object 10 or reaches the finish end of the object 10, the photodetector 26 will basically detect a brightness signal rather than the darkness signals. Therefore, the counter 32 must terminate its counting operation in response to the trailing edge pulse in the detection signal 200. For this end, the content of the counter 32 is adapted to be latched by the register 38. The trailing edge signal of the edge pulse 202 is discriminated by the edge discriminating circuit 56 to trigger the inhibition pulse generator 40 to output inhibition pulses 208. During this action, therefore, the AND gate 58 is closed to temporarily inhibit the counting operation of the counter 32 for a predetermined period of time.

On the other hand, latch pulses 210 delayed by the first delay circuit 60 are supplied to the latch input of the register 38 in synchronism with the inhibition pulses 208. After a predetermined period of time has passed from the inhibition of the counting operation of the counter 32, that is, when there has elapsed the period of time for which the counted value is stabilized, the content of the counter 32 is latched by the register 38.

Thus, the register 38 can fetch any stabilized count of the counter 32 at the trailing edge of a detection signal 200, so that the finish end of the object 10 will accurately be caught by the photodetector 26.

However, this latching operation is similarly applied to the trailing edge of an undesirable detection signal 200 which has been created, for example, by the foreign matter 10a on the way of the scanning for the object 10.

Since the counting operation of the counter 32 is temporarily inhibited at this time, the content of the counter 32 will have a large error even though the latched value will be discarded later. In accordance with the present invention, such an error may be corrected by triggering the count correction circuit 42 under the delayed signal in synchronism with the inhibition pulse 208 and supplying the counter 32 with a count correction pulse 212 from the count correction circuit 42.

The correction pulse 212 is outputted later than the latch pulse 210 so that the latched value in the register 38 will not be affected thereby. The correction pulse 212 is supplied to the counter 32 as a bit signal corresponding to the aforementioned period of inhibition. Therefore, a predetermined number of digits is simultaneously added to instantaneously correct the count differing from the correction by the input of clock pulses. When the inhibition pulses 208 are released for the counter 32 to re-initiate its counting operation for the clock pulses 206, therefore, the count will properly coincide with the position of scan of the measuring rays.

The latching operation of the register 48 is made at each of the trailing edges of the detection signal 200, so that each of values latched by the detection signal 200a created by the foreign matters 10a will sequentially be discarded on the next latching operation. Finally, the latched value in the register 38 will be determined only by a signal corresponding to the finish end of the object 10. Even if false signals are created due to the transparent part and others on the object 10, these false signals can sequentially be cleared to determine a proper latched value. In accordance with the present invention, consequently, a high-accuracy measurement can be carried out even for a transparent object to be measured.

Even after the register 38 has latched the counted content of the counter 32 corresponding the finish end of the object 10, the counter 32 still counts clock pulses 206. However, the latching operation of the register 38 is no longer carried out so that the measurement will not be affected by the counted content of the counter 32. Before initiation of the next scanning operation, the start signal 300 is used to load the counter 32 with the latched value obtained in the preceding scanning operation so that the other counted content obtained in the preceding scanning operation will completely be discarded.

Immediately before termination of each scanning operation, the flip flop 48 is reset to prepare against the next scanning operation by means of an end signal 302 from the scan completion sensor 36.

If a plurality of scanning operations have been completed, CPU 70 fetches the accumulated measurements latched in the register 38. These fetched measurements are subjected to any suitable computations such as averaging and others in the CPU 70 to indicate a proper measurement.

In accordance with the present invention, clock pulses created by the measuring rays which are scanning an object to be measured are counted by a counter with the counted contents thereof being sequentially latched by a register. Each of the latching operations is carried out after passage of a predetermined period of time starting from the stoppage of the counting operation in the counter. Any delay in counting or latching can sufficiently be dealt with in accordance with the present invention. This provides an accurate measurement without any error in the latched value and made it possible to set the frequency in the clock pulses used as a measurement basis at a very high level.

Since false detection signals created on the way of a scanning for the object can also be subjected to a correcting action corresponding to a period of inhibition for count after each of the latching operations has been terminated such that the counter will be caused to re-initiate its counting operation for clock pulses, latched values obtained from false detection signals on the way can sequentially be discarded to provide the measurement without error.

We claim:

1. An optical measuring apparatus comprising a light scanning section for illuminating an object to be measured with parallel scanning and measuring rays, a photodetector section for detecting changes of intensity in said parallel scanning and measuring rays passed through said object to generate photodetection output signals, and a counter for counting clock pulses during the scanning of said rays, the length of said object being determined based on the counted value obtained in said counter while said parallel scanning and measuring rays is moving along the length of said object, said apparatus being characterized in that said counter is adapted to initiate its counting operation for the clock pulses as said parallel scanning and measuring rays pass over the start end of said object; and in that said apparatus further comprises a temporal inhibition circuit for inhibiting the counting operation of said counter for a period of time in response to either of false detection signals created from said parallel scanning and measuring rays passed through said object after the initiation of said counting operation or a detection signal indicative of the finish end of said object, a register for latching the output of said counter during the period of inhibition and also after the output of said counter has been stabilized, a correcting circuit for adding a correction value corresponding to said period of inhibition to said counter during the counting operation and also after said latching operation has been terminated, all the false detection signals created while the parallel scanning and measuring rays are passing over said object being discarded to effect a proper measurement based on clock pulses counted between the start and finish ends of said object.

2. An optical measuring apparatus as defined in claim 1, characterized in that the scanning of said parallel scanning and measuring rays is repeated plural times and in that an averaged value is outputted after completion of a predetermined number of scanning operations.

* * * * *